July 12, 1960

T. R. SMITH ET AL 2,944,415

FILTER FOR WASHING MACHINE

Filed Feb. 4, 1957

Inventors
Thomas R. Smith & Charles W. Burkland
by James S. Nettleton
Attorney

July 12, 1960

T. R. SMITH ET AL 2,944,415

FILTER FOR WASHING MACHINE

Filed Feb. 4, 1957

Inventors
Thomas R. Smith &
Charles W. Burkland
by James S. Nettleton
Attorney

July 12, 1960
T. R. SMITH ET AL
2,944,415
FILTER FOR WASHING MACHINE
Filed Feb. 4, 1957
4 Sheets-Sheet 3
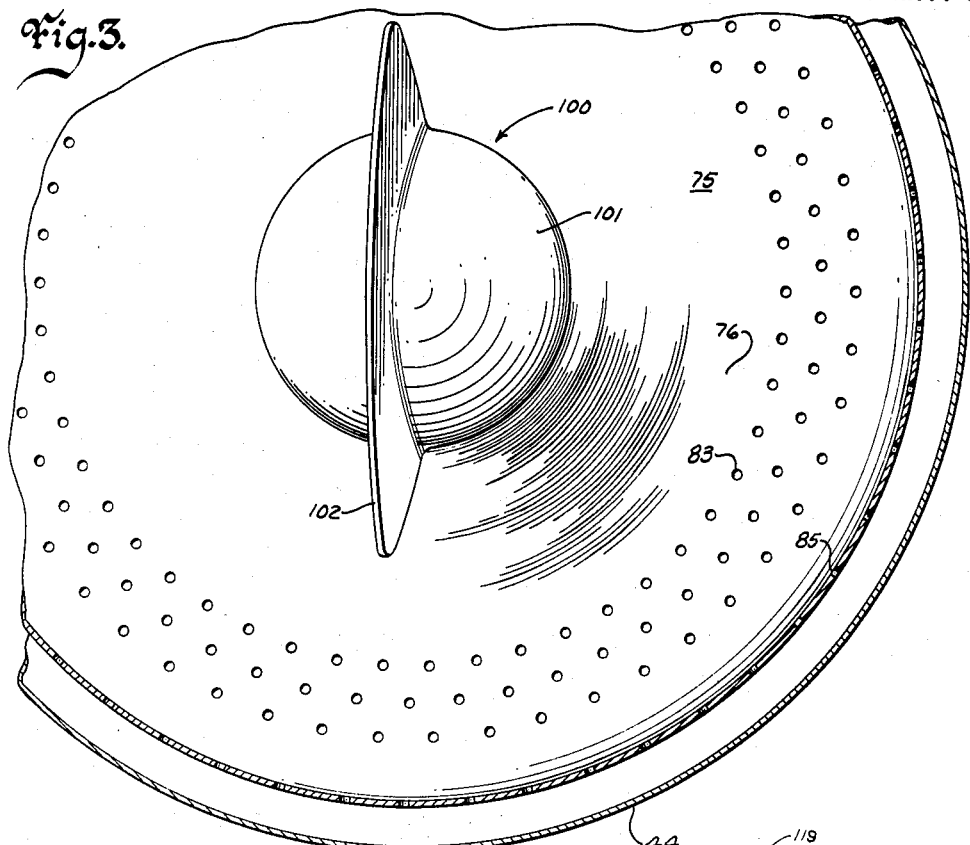
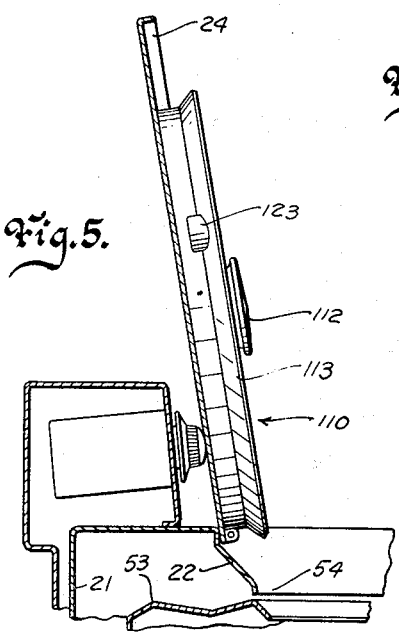
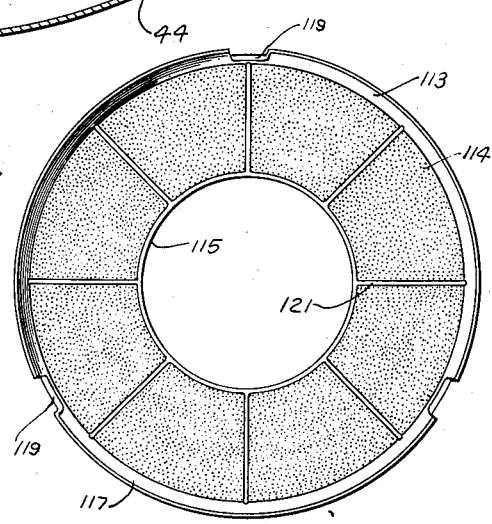
Inventors
Thomas R. Smith &
Charles W. Burkland
by James S. Nettles
Attorney

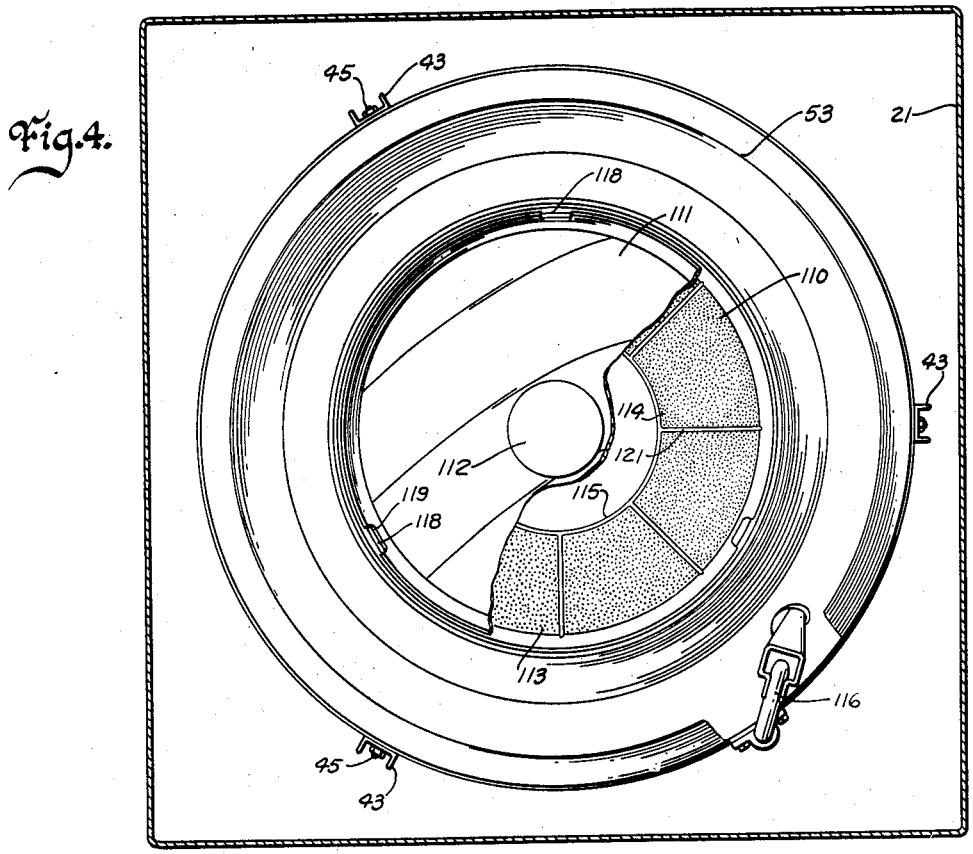
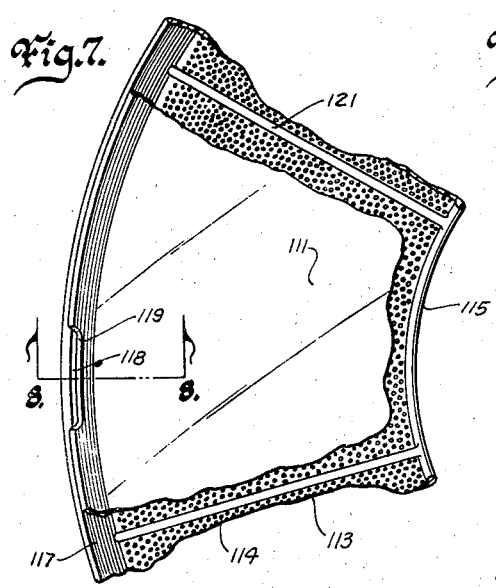
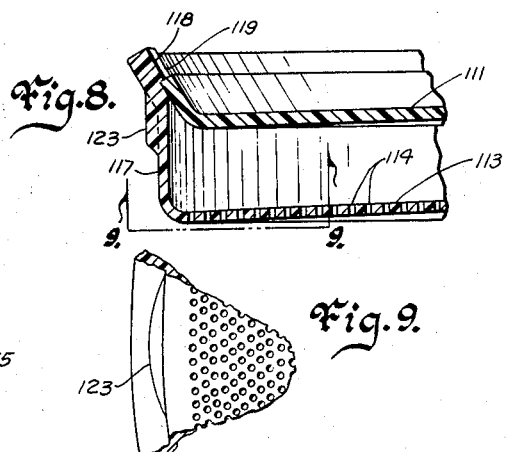

United States Patent Office 2,944,415
Patented July 12, 1960

2,944,415

FILTER FOR WASHING MACHINE

Thomas R. Smith and Charles W. Burkland, Newton, Iowa, assignors to The Maytag Company, Newton, Iowa, a corporation of Delaware Filed Feb. 4, 1957, Ser. No. 637,931

13 Claims. (Cl. 68—18)

This invention relates to a means for filtering washing fluid contained within the tub assembly of a washing machine.

It is particularly directed to a filter assembly adapted for use in a vertical axis washing machine incorporating a wobble type agitator capable of directing a continuously rising fountain of fluid toward the filter assembly positioned above that agitator in the flow pattern of the rising geyser of fluid to automatically filter from that fluid the lint, ravelings and thread particles separated from the fabrics within the machine to thereby prevent a haphazard redepositing of these particles on the fabrics processed within that machine.

An object of this invention therefore is to prevent lint, ravelings and thread particles separated from fabrics during the agitation operation from redepositing upon other fabrics after the tub assembly has been drained of its fluid.

A further object of this invention is to produce a filter assembly which will filter from the washing fluid contained within a washing machine those particles of lint, ravelings and thread particles which during the agitation operation become separated from the fabrics contained within that machine.

Another object of this invention is to utilize the splash or fountain created by certain types of wobble agitators as a means for forcing washing fluid through a cooperating filter assembly positioned in the flow pattern of that fountain of fluid to thereby filter the washing fluid and prevent a haphazard matting and redepositing of the separated lint, ravelings and thread particles on the fabrics within the washing machine during and subsequent to the agitation process creating the initial separation of these particles from those fabrics.

A further object is to provide a combination fluid filter and lid assembly which may be easily inserted and removed from the washing machine incorporating that assembly.

A still further object of this invention is to provide a combination filter and lid assembly which will enable the operator of a washing machine incorporating this assembly to see the stage of operation being performed within that machine as well as indicating to the operator the quantity of lint, ravelings, thread and other foreign particles retained within that assembly.

Other objects and advantages of this invention will be more apparent after reference is made to the accompanying specifications and drawings in which:

Figure 3 is an enlarged fragmentary view taken on line 3—3 of Figure 1;

Figure 4 is a view, partially broken away, taken along line 4—4 of Figure 1 showing the combination lid and filter assembly for the machine shown in Figure 1;

Figure 5 is a fragmentary side elevational view showing the preferred positioning of the combination lid and filter assembly during the loading operations of the washing machine shown in Figure 1;

Figure 6 is a plan view of the filter plate of the filter assembly shown in Figure 4;

Figure 7 is an enlarged fragmentary view showing the means for fastening the filter plate to the lid to form the combination lid and filter assembly;

Figure 8 is an enlarged sectional view taken on line 8—8 of Figure 7 showing the cooperation between the filter plate and the lid of the combination lid and filter assembly and showing the cam lugs for maintaining the combination lid and filter assembly in place when inserted into a cooperating access opening of a washing machine;

Figure 9 is a fragmentary bottom view taken on line 9—9 of Figure 8 showing a cam lug formed on the filter plate; and, Figure 10 is a diagrammatic representation illustrating the manner in which the combination lid and filter assembly is inserted into the access opening of a washing machine utilizing this combination lid and filter assembly.

Figure 1:
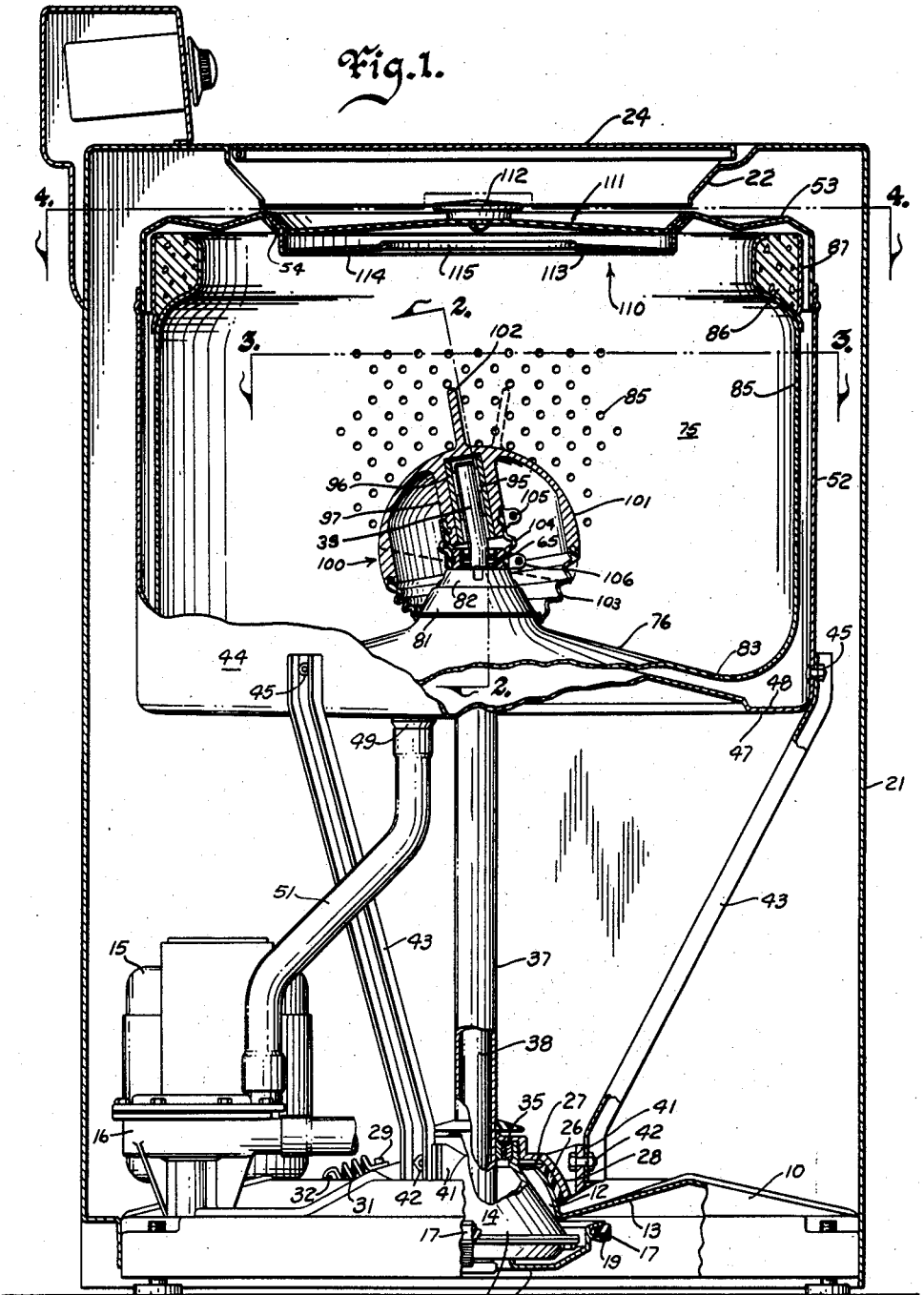
Figure 1 is a side elevation, partially broken away, showing a washing machine incorporating our invention.

Referring now to the accompanying drawings, there is shown a base frame member 10 mounted on adjustable feet 11 and provided with a supporting truncated dome 12 rising out of a centrally located concave depression 13 in base frame 10. Dome 12 serves as a mounting for a drive assembly 14 such as that disclosed in the John D. Goodlaxson application Serial No. 505,231, filed May 2, 1955, and assigned to the same assignee as that of the instant application.

Base frame 10 also supports the upended reversible motor 15 and water pump 16 which like the drive assembly 14 is driven by motor 15 through belt 17 on the underside of base frame 10. Numeral 19 designates the groove of pulley 18 which serves as input member for drive assembly 14.

Cabinet 21, attached to an enclosing base frame 10 together with the drive and tub assemblies supported thereby, is provided at its upper end with a depending flange 22 defining an access opening to the washing machine apparatus which is normally covered by the door panel 24.

Dome 12 is provided with a number of friction pads 26 on its periphery adjacent the opening 27 formed in the uppermost portion of that dome. An umbrella-like damper member 28 rests on these friction pads 26 and is provided with three equally spaced ears 29 for the three centering springs 31 attached to base frame 10 by brackets 32 on the latter member. This arrangement centers support member 28 on dome 12 and restrains it from rotation.

Threaded into the umbrella support member 28 is a member 34 of substantially frusto-conical configuration which serves as a housing for drive assembly 14 of the previously identified Goodlaxson application Serial No. 505,231. Housing member 34 cooperates with the damper support member 28 by gripping the outer race of a thrust bearing 35 which is provided with a tapered inner race.

Mating with and seated in this tapered inner race of the thrust bearing 35 is the spin tube or shaft 37 which in turn journals a power shaft 38 also extending into the drive assembly 14. With this construction, all weight placed on spin tube 37, housing 34 and umbrella member 28 may be used to an advantage to provide ample damping frictional forces between umbrella member 28 and the friction pads 26 for damping nutational movements of shafts 37 and 38 relative to dome 12 while permitting rotational movement of spin tube 37 in thrust bearing 35.

While the details of the Goodlaxson drive assembly forming the basis of the previously identified application Serial No. 505,231 are not essential to the construction of the instant invention, its operation can be briefly explained for environmental purposes. Upon energization of motor 15 in a direction to rotate the pulley 18 in a counterclockwise direction as viewed from the bottom of Figure 1, power shaft 38 is rotated in this same direction while spin shaft 37 is held against rotation by appropriate braking mechanism within housing 34. Upon reversal of motor 15, spin shaft 37 is released for rotation to allow both shafts 37 and 38 to be spun in unison in a clockwise direction.

With the drive and support constructions set forth above, it can be seen that shafts 37 and 38 may be selectively rotated as determined by the direction of rotation imparted to pulley 18 while permitting their nutation about a vertical axis at all times. In the modification set forth in the accompanying drawings, shafts 37 and 38 nutate on a point determined by the intersection of the axis of rotation with the plane bisecting groove 19 of pulley 18.

Damper support member 28 is provided with three upstanding lugs 41 of channel-like cross section spaced equally from each other and alternately around member 28 with respect to the spring anchor ears 29. Fastened within the grooved lugs 41 by means of connectors 42 are the three tub brace members 43 which are of channel-like cross section. Brace members 43 extend upwardly and outwardly from umbrella support member 28 to join the nonrotatable tub 44 through tub connectors 45.

Figure 10:
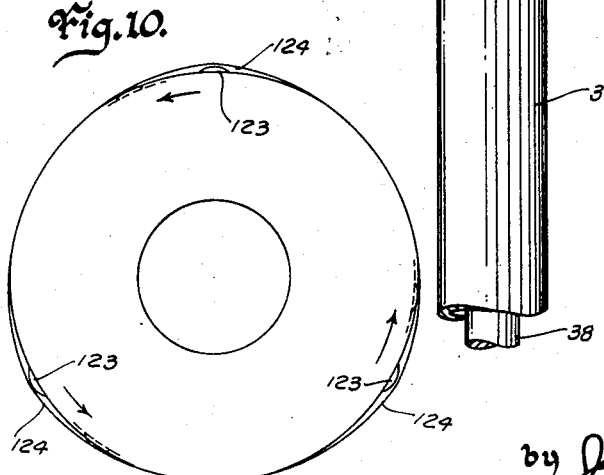

Tub 44 is provided with a bottom wall 47 in which is formed a C-shaped gutter 48 having its lowermost portion converging into the drain outlet 49 which in turn communicates with water pump 16 through the flexible drain hose 51. Tube 44 is also provided with an imperforate cylindrical side wall 52 which joins and supports a tub crown 53 provided with an access opening 54 aligned with that opening defined by the depending cabinet flange 22. While access opening 54 is practically circular in shape, it is slightly distended by the three recesses 124 formed therein as shown in the diagrammatic view of Figure 10.

Figure 2:
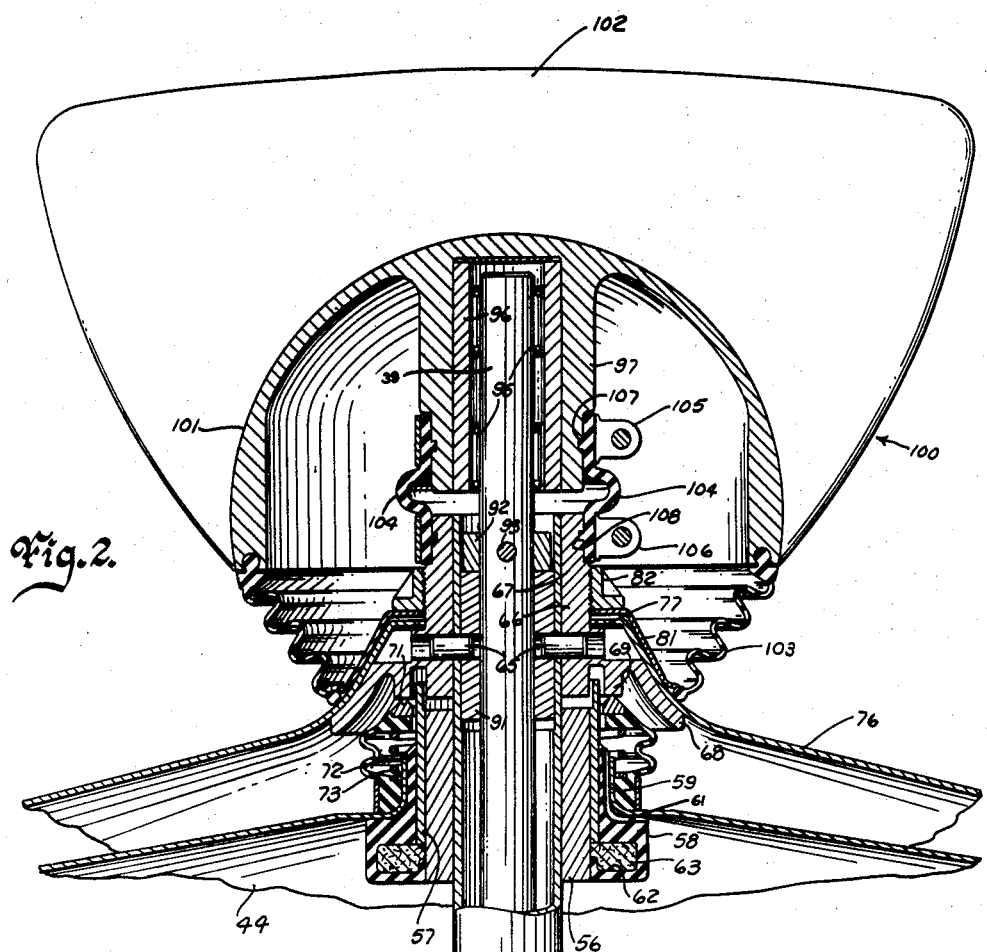
Figure 2 is an enlarged sectional view taken along line 2—2 of Figure 1.

Referring now to Figures 1 and 2, it can be seen that spin tube 37 extends upwardly from drive assembly 14 through a porous sintered metal bearing 56 which is supported by a steel sleeve 57 having its outer periphery bonded to a rubber mounting sleeve 58. Rubber sleeve 58 is maintained in an upright position by a squeeze fit in the centrally located opening formed by the upstanding flange 59 formed in the bottom wall 47 by tub 44. Rubber sleeve 58 permits bearing 56 to align itself with spin tube 37 and is provided with drain grooves 61 of L-shaped cross section as shown in Figure 2 to provide for seepage from tub 44 in a manner set forth hereinafter.

The lower portion of rubber sleeve 58 forms an oil reservoir 62 filled with oil saturated wicking 63 which contiguously encircles the lower end of the porous bearing 56 to constantly lubricate the bearing surfaces between spin tube and bearing 56.

Affixed to the upper end of the spin tube 37 by means of cross pins 65 is the basket carrier member 66 which is provided with a mounting stem 67, a tapered tub supporting flange 68 and a depending annulus 69. The lower end of annulus 69 defines a bearing surface abutted by the carbon nose ring 71 which is sealed to and forms a part of the boot seal 72 clamped to the outer periphery of the tub flange 59. Nose ring 71 is pressed upwardly into sealing engagement with annulus 69 by means of the coil spring 73 which is mounted concentrically within boot seal 72.

The mounting flange 68 provides a support for the clothes receptacle or basket 75 which is provided with a bottom wall 76 having a centrally located reentrant portion formed with a contour mating substantially with that of its supporting flange 68. Bottom wall 76 terminates in an inwardly directed horizontal flange 77 defining an opening to receive the mounting stem 67 of carrier member 66.

Clothes receptacle 75 is wedged between carrier flange 68 by means of the clamp washer 81 which has a contour similar to that of the central reentrant portion of the basket 75. Clamp washer 81 is provided with an upwardly rolled peripheral edge which facilitates removal of washer 81 from receptacle 75 and prevents its gouging the surface of basket bottom wall 76 once this receptacle mounting structure is assembled. This rolled peripheral portion of clamp washer 81 may also serve as a boot seal anchoring member as will be more apparent hereinafter.

Clamp washer 81 is urged downwardly against the central reentrant portion of bottom wall 76 by means of the large nut 82 threaded on the mounting stem 67. Since, in actual practice, the inner tub or basket 75 is porcelain enameled, a cork gasket (not shown) is used between the mounting flange 68 and the contacting portion of bottom wall 76 to provide a water-tight seal for basket 75 and to assure a more uniform loading between these parts.

Basket bottom wall 76 is provided with circular rows of holes 83 at its lowermost portion to provide a means for heavy sediment shaken loose from fabrics during the washing operation to pass into the outer tub 44. Basket 75 is also provided with a perforate cylindrical side wall 85 to facilitate separation of fluid from fabrics during the centrifuging operation. Side wall 85 is provided at its uppermost end with a concrete inertia ring 86 cast between an inturned terminal portion of side wall 85 and the encompassing hoop member 87 attached to that side wall.

The upper end of spin tube 37 is provided with a bearing 91 which is maintained in place by means of the cross pins 65. Bearing 91 journals the agitator power shaft 38 and serves as a seat for the thrust collar 92 pinned to shaft 38 by means of the cross pin 93 to thereby prevent any downward axial movement of that shaft.

Shaft 38 includes an upper terminal portion 39 which bends slightly from the vertical as it protrudes past the upper end of spin tube 37. This bent portion 39 of shaft 38 is received within needle bearings 95 retained within the hardened sleeve 96 contained by the cylindrical hub 97 of wobble agitator 100.

Wobble agitator 100 includes an inverted truncated sphere 101 which forms the hemispherical base portion of the agitator 100 and provides access to the connections to its cylindrical hub 97. To this hemispherical base portion 101 is attached a wing-like upstanding fin 102 which serves as a clothes agitating means for the clothes received by clothes basket 75. The lower edge of the truncated sphere 101 is affixed to the upper end of a flexible bellows member 103 which has its lower end snapped around or wedged beneath the outwardly projecting peripheral edge of clamp washer 81 to prevent clothes from working under agitator 100. With the lower end of bellows member 103 anchored beneath clamp washer 81, the hemispherical base member 101 cooperates with bellows member 103 to form a substantially spherical base portion for agitator 100.

The cylindrical hub 97 of agitator 100 has its terminus encircled by the upper end of a tough, flexible, bulbous sleeve 104 which is clamped thereto by means of a hose clamp 105. The lower end of the flexible sleeve 104 is fastened to the upper end of the basket mounting stem 67 by the lower hose clamp 106. Both the hub 97 and the mounting stem 67 are provided with recesses 107 and 108, respectively, which cause clamps 106 and 107 to extrude a portion of sleeve 104, which in practice has been of rubber, into these respective recesses when clamps 105 and 106 are tightened. This arrangement not only restrains agitator 100 from rotation with center shaft 38 and prevents clothes from working beneath agitator 100 but also provides a watertight seal for the central drive shaft structure. In addition, sleeve 104 also restrains agitator 100 from axial movement relative to shaft portion 39.

Mounted above agitator 100 in the access opening 54 is the combination lid and filter assembly generally indicated by the arrow 110. Assembly 110 is of two parts, the first being a transparent cover-deflector 111, to which knob 112 is affixed, and the second part being the cooperating filter plate 113 provided with numerous small filter holes 114 forming a filter screen or mesh in plate 113. Filter 113 is provided with a large centrally located water intake opening 115 which receives the fountain or geyser of water produced by the wobbling movement of agitator 100. Water received by the cover filter assembly 110 through this intake opening 115 is discharged through the smaller filter holes 114 back into the tub assembly below during the agitation operation of this machine.

Filter 113 is also provided with a side flange 117 the upper portion of which is outwardly tapered to form the sole support for the filter assembly 110 when it is seated in the access opening 54.

The inner face of the upper portion of flange 117 is provided with three equally spaced small projections 118 which are received by the mating recesses 119 formed in the rim of the transparent cover 111 to form the means for connecting the latter member to filter 113. Since the filter 113 has in actual practice been made of molded plastic strengthened by the ribs 121, the separation of the cover member 111 from filter 113 is easily accomplished by grasping the knob 112 with one hand and then depressing any one of the projections 118 with the other hand to move that projection away from the adjacent recess 119 retaining it to thereby allow a separation of the two members 111 and 113. When so separated, cover 111 may be placed over opening 54 in the same fashion as filter 113 due to the identical taper of the upper peripheries of members 111 and 113.

In order to secure the combination cover filter assembly 110 in its position within access opening 54, the outer peripheral surface of flange 117 is provided with three equally spaced cam lobes 123 which project outwardly a small distance from that flange. These cam lobes 123 are received in the three slightly dilated or distended portions 124 of the nearly circular access opening 54 so that rotation of the cover filter assembly 110 in either a clockwise direction or counterclockwise direction (as shown in the diagrammatic view of Figure 10) will cause the cam lobes 123 to cam assembly 110 tightly within the access opening 54 and retain it securely in that position until it is freed from its frictional engagement within the sides of opening 54 by a reverse rotation.

In operation, tub 44 is filled with wash water through the fill spout 116 to a level approximately an inch or so above vane 102 by a control mechanism which is not shown and which forms no part of this invention. Upon the energization of the washing machine by a control circuit (not shown), the rotation of drive pulley 14 by motor 15 in a counterclockwise direction as viewed from the bottom of Figure 1 causes the spin shaft 37 and basket 75, to which it is unitarily connected by the disclosed connections to that basket, to be braked by appropriate braking mechanism within housing 34 while the power shaft 38 rotates in a counterclockwise direction. This produces relative movement between shaft 38 and the basket 75 and causes the agitator 100 to move in accordance with the motions imparted to it by the bent portion 39 of power shaft 38.

Rotation of the agitator shaft 38 causes its upper bent portion 39 to describe an inverted cone of revolution with its vertex at the point at which the shaft 38 is bent. Since the hub 97 of agitator 100 journals this bent shaft portion 39, its geometric axis also generates an inverted cone of revolution but due to its anchorage to basket 75, wobble agitator 100 does not rotate as does shaft 38 and therefore produces a wobbling action instead.

Since the radius of curvature of the hemispherical base portion 101 is equal to the distance from any point on its outer spherical surface to the vertex of the cone described by the bent portion of the revolving shaft 38, that base portion 101 turns within its surrounding fluid without creating any rotational or disturbing forces on that fluid except for those forces produced by the frictional drag of the spherical portion per se.

However, the upstanding wobbling vane 102 which, in this embodiment is symmetrically mounted at right angles to the spherical base portion of 101, produces a vigorous churning action around that vane. Clothes floating across the top of vane 102 rise and fall rapidly as the upper edge of that vane comes in contact with them during the rapid rotation of shaft 38. In practice, this rotational speed of shaft 38 has been equivalent to the desired fluid extraction speed during the following centrifuging processes which has resulted in this shaft being rotated at speed preferably exceeding 600 r.p.m.

In addition to being lifted and scrubbed by their contact with the vane 102, clothes are thoroughly flushed in the churning action which causes the fluid currents to rise from agitator 100 and then to be forced downwardly along the inner periphery of basket 75 before rising again in the central area of that clothes receptacle. Clothes subjected to the action of these strong fluid currents tend to follow these circulating paths within the clothes basket 75 but lag sufficiently behind those fluid currents to crisscross erratically across and above the top of agitator 100 to be thoroughly cleaned in this vigorous churning action.

In addition to these actions, wobbling vane 102 produces rapid pulsations corresponding in number to the rotational speed of shaft 38 to be imparted to the fluid retained within tub 44. These short pulsations also aid in the separation of soil and other impurities from fabrics retained within basket 75.

Agitator 100 also performs the additional function of providing a pumping means for flowing the washing fluid through the upper filter assembly 110 to filter out and separate lint, ravelings and thread particles from the washing fluid passing through that assembly. The rapid churning of vane 102 causes a fountain-like geyser of washing fluid to rise upwardly through the centrally located opening 115 against the transparent cover 111 which deflects and diffuses the water outwardly over the filter 113 which retains the lint, thread particles and lighter sediment while allowing the washing fluid to pass through the filter holes 114 and drain back into the tub 44. The transparent cover 111 allows the operator of the machine to not only watch the various stages of the washing operation but also apprises her of the presence of lint and foreign matter retained within the filter assembly 110.

The two-piece filter cover assembly 110 may be easily cleaned by separating parts 111 and 113 as described previously. If for any reason it is not desired that the filter 113 be used, cover 111 may be used alone to cover the access opening 54. If it is desired to use cover 111 without filter 113 permanently, the transparent cover member 111 may be molded with cam lobes similar to cam lugs 123 in order to firmly secure the cover 111 within access opening 54 in a manner similar to that for the entire assembly 110.

While our filter assembly has been illustrated in conjunction with a specific agitator capable of pumping fluid into this filter assembly, this filter assembly may also be used with other agitators and tub constructions to produce equivalent filtering results. In addition, it is within the spirit of this invention to use this filter assembly in various positions relative to the tub or casing holding the washing fluid in order to achieve a filtering of that fluid in accordance with the inventive principles disclosed in this specification.

We claim:

1. In a washing machine adapted to receive fluids and having an agitator for agitating said fluids, a first member having a portion thereof defining an access opening into said machine, a filter member positioned in said opening and provided with cam projections for wedging said filter member in said opening whenever said filter member is rotated relative to said first member, said filter member including an intake opening for receiving fluids splashed from said agitator and further including filter means for filtering foreign particles from fluids splashed through said intake opening by said agitator, said agitator having means thereon to direct fluids upwardly into said intake opening.

2. In a washing machine adapted to receive fluids and provided with an agitator for agitating said fluids, a member having a portion thereof defining an access opening into said machine, a filter assembly positioned in said access opening and provided with cam projections for wedging said filter assembly in said opening whenever said filter assembly is rotated relative to said member, said filter assembly including a filter plate having a centrally located fluid intake opening positioned above said agitator and a perforate portion for screening foreign particles from fluids splashed into said intake opening by said agitator, said agitator having means thereon to direct fluids upwardly into said intake opening.

3. In a washing machine adapted to receive fluids and provided with an agitator for agitating said fluids, a member defining an access opening into said machine, a filter assembly positioned in said access opening, said filter assembly including an intake opening positioned above said agitator and above the static level of said fluid and further including filter means for screening foreign particles from fluid splashed into said intake opening by said agitator, said agitator having means thereon to direct fluids upwardly through said intake opening to said filter means.

4. In a washing machine adapted to receive fluids and provided with an agitator for agitating said fluids, a member having a portion thereof defining an access opening into said machine, a filter assembly positioned adjacent said access opening, said filter assembly including a filter plate provided with an intake opening positioned above said agitator and including a filter mesh for screening foreign particles from fluids splashed through said intake opening by said agitator, said filter assembly further including an imperforate cover plate connected to said filter plate to provide a means for deflecting toward said filter mesh those fluids splashed through said intake opening, said agitator having means thereon to direct fluids upwardly into said intake opening.

5. In a washing machine adapted to receive fluids and provided with an agitator for agitating said fluids, a member having a portion thereof defining an access opening into said machine, a filter assembly positioned concentric to said access opening, said filter assembly including a filter plate provided with at least one intake opening and filtering means for screening foreign particles from fluids splashed through said intake opening by said agitator, said filter assembly further including an imperforate cover plate removably connected to said filter plate to deflect into said filter means those fluids splashed through said intake opening and said agitator having means thereon to direct fluids upwardly into said intake openings.

6. In a vertical axis washing machine adapted to receive fluids and provided with an agitator for agitating said fluids, a member having a portion thereof defining an access opening into said machine, a filter assembly positioned adjacent said access opening and including a filter plate provided with at least one intake opening for receiving fluid splashed upwardly from said agitator, said filter assembly further including filtering means for screening foreign particles from fluid splashed into said intake opening by said agitator and said agitator having means thereon to direct fluids upwardly into said intake opening.

7. In a vertical axis washing machine adapted to receive fluids and provided with an agitator for agitating said fluids, a first member having a portion thereof defining an access opening into said machine, a filter assembly positioned adjacent said access opening and including a filter plate provided with an intake opening for receiving fluids splashed upwardly from said agitator, said filter assembly further including a filtering means for screening foreign particles from fluids splashed into said intake opening by said agitator, said agitator having means thereon to direct said fluids upwardly into said intake opening, and an imperforate cover plate connected to said filter plate for deflecting fluids from said agitator toward said filtering means.

8. In a vertical axis washing machine adapted to receive fluids and provided with an agitator for agitating said fluids, a member having a portion thereof defining an access opening into said machine, a filter assembly positioned adjacent said access opening and including a filter plate provided with a central intake opening for receiving fluids splashed upwardly from said agitator, said agitator having means thereon to direct fluids upwardly through said intake opening, said filter assembly further including filtering means for screening foreign particles splashed into said intake opening by said agitator, said filter assembly further including an imperforate cover plate having separable connections with said filter plate for selectively connecting said cover plate to said filter plate.

9. In a vertical axis washing machine adapted to receive fluids and provided with an agitator for agitating said fluids, a first member having a portion thereof defining an access opening into said machine, a filter assembly positioned adjacent to said access opening and including a filter plate provided with an intake opening for receiving fluids splashed upwardly from said agitator, said agitator having means thereon to direct said fluids upwardly through said intake opening, said filter assembly further including filtering means for screening foreign particles from fluids splashed into said intake opening by said agitator, and an imperforate cover plate having marginal connections with said filter plate for selectively connecting said cover plate to said filter plate, and cam means on said filter assembly for engaging said portion to wedge thereagainst whenever said filter assembly is rotated relative to said first member.

10. In a washing machine adapted to contain washing fluid and fabrics to be washed therein, agitator means for agitating said fabrics in said fluid, a fluid filter spaced from said agitator means, a fluid deflector adjacent said filter for deflecting fluids into said filter, said agitator having means thereon to direct said fluids upwardly to said deflector, and means for moving said agitator means for forcing fluid upwardly against said deflector and into said filter to separate from said fluid those lint and thread particles separated from said fabrics and suspended in said fluid.

11. In a vertical axis washing machine adapted to contain washing fluid and fabrics to be washed therein, a wobble agitator for agitating said fabrics in said fluid and means for producing an axially and upwardly directed geyser of said fluid during operation of said agitator, a fluid filter spaced above said agitator in the flow pattern of said geyser of fluid and including an axial intake opening adapted to receive said geyser of fluid from said agitator, and means for moving said agitator to force said fluid upwardly into said filter for separating from said fluid those lint and thread particles separated from said fabrics and carried in said fluid.

12. In a vertical axis washing machine adapted to contain washing fluid and fabrics to be washed therein, a wobble agitator for agitating said fabrics in said fluid and for producing an axial vertical geyser of said fluid during operation of said agitator, a fluid filter assembly spaced above said agitator in the flow pattern of said central geyser of fluid, said filter assembly including an intake opening for receiving said geyser of fluid and further including filter means for filtering fluid received through said openings, said filter assembly further including a fluid deflecting surface for deflecting said geyser of fluid into said filter means for separating suspended foreign particles from said fluid passing through said filter means.

13. In a washing machine adapted to contain washing fluid and fabrics to be washed therein, a member defining an access opening into said machine, a fluid filter assembly positioned adjacent said access opening, said filter assembly including an intake opening for receiving said fluid, said filter assembly further including filter means for filtering foreign particles from fluid received by said filter assembly through said intake opening, a fluid deflecting surface in said filter assembly above said filter means for deflecting toward said filter means those fluids receive through said intake opening, and means for forcing said fluid upwardly through said intake opening to said deflecting surface.

References Cited in the file of this patent

UNITED STATES PATENTS

| | | |
|---|---|---|
| 1,335,853 | Myrick | Apr. 6, 1920 |
| 1,439,823 | Kaufmann | Dec. 26, 1922 |
| 1,899,495 | Celaya | Feb. 28, 1933 |
| 1,905,523 | Stoddard | Apr. 25, 1933 |
| 1,947,382 | Crowley | Feb. 12, 1934 |
| 1,953,409 | Hovda | Apr. 3, 1934 |
| 2,047,177 | Davis | July 14, 1936 |
| 2,298,096 | Dunham | Oct. 6, 1942 |
| 2,660,744 | Cockrell | Dec. 1, 1953 |